United States Patent
Lahr et al.

(10) Patent No.: US 11,646,620 B2
(45) Date of Patent: May 9, 2023

(54) PRELOADING MAGNETS IN A ROTOR CORE

(71) Applicant: GM Global Technology Operations LLC, Detroit, MI (US)

(72) Inventors: Derek F. Lahr, Howell, MI (US); Farzad Samie, Franklin, MI (US); Edward L. Kaiser, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 17/230,501

(22) Filed: Apr. 14, 2021

(65) Prior Publication Data

US 2022/0337111 A1 Oct. 20, 2022

(51) Int. Cl.
| H02K 1/28 | (2006.01) |
| H02K 15/02 | (2006.01) |
| H02K 15/03 | (2006.01) |
| H02K 1/276 | (2022.01) |

(52) U.S. Cl.
CPC ............... *H02K 1/28* (2013.01); *H02K 1/276* (2013.01); *H02K 15/024* (2013.01); *H02K 15/03* (2013.01); *Y10T 29/53143* (2015.01)

(58) Field of Classification Search
CPC ......... Y10T 29/49012; Y10T 29/49009; Y10T 29/49078; Y10T 29/49075; Y10T 29/53143; H02K 3/493; H02K 15/03; H02K 1/278; H02K 21/12; H02K 1/27; H02K 1/28
USPC ......... 29/598, 596, 604, 607, 609, 732, 738, 29/729
See application file for complete search history.

(56) References Cited

U.S. PATENT DOCUMENTS

| 5,889,342 | A | 3/1999 | Hasebe et al. |
| 7,705,503 | B2 | 4/2010 | Takahashi et al. |
| 9,030,062 | B2 | 5/2015 | Matsumoto |
| 9,041,261 | B2 | 5/2015 | Yamamoto et al. |
| 9,806,572 | B2 | 10/2017 | Yamagishi et al. |
| 10,116,178 | B2 | 10/2018 | Horii et al. |
| 2004/0217666 | A1* | 11/2004 | Mellor ............ H02K 1/276 310/156.53 |
| 2012/0299403 | A1 | 11/2012 | Stahlhut et al. |
| 2013/0020889 | A1 | 1/2013 | Yamamoto et al. |
| 2013/0026871 | A1 | 1/2013 | Dam et al. |
| 2013/0313923 | A1 | 11/2013 | Hamer et al. |
| 2013/0334910 | A1 | 12/2013 | Takahashi et al. |

(Continued)

FOREIGN PATENT DOCUMENTS

JP 2010193660 A 9/2010

*Primary Examiner* — Thiem D Phan
(74) *Attorney, Agent, or Firm* — Vivacqua Crane, PLLC (57) ABSTRACT

A rotor core for an electric machine of an automobile includes a core stack including a plurality of lamination plates, each lamination plate including a plurality of apertures formed therein, the apertures of each of the lamination plates axially aligned to define a plurality of magnet slots extending axially through the core stack, a plurality of magnets stacked axially within each of the plurality of magnet slots along a length of the core stack, at least one of the plurality of magnet slots including a cavity extending axially along the length of the core stack, and a wedge inserted within the cavity adapted to apply a lateral force onto the plurality of magnets within the at least one magnet slot to secure the plurality of magnets within the at least one magnet slot.

20 Claims, 6 Drawing Sheets

(56) References Cited

U.S. PATENT DOCUMENTS

| | | |
|---|---|---|
| 2014/0028139 A1 | 1/2014 | Hamer et al. |
| 2014/0070637 A1 | 3/2014 | Hamer et al. |
| 2016/0036276 A1 | 2/2016 | Yamagishi et al. |
| 2016/0134163 A1 | 5/2016 | Hamanaka et al. |
| 2016/0226326 A1 | 8/2016 | Gotschmann et al. |
| 2016/0261158 A1 | 9/2016 | Horii et al. |
| 2016/0294262 A1 | 10/2016 | Yomoda et al. |
| 2017/0155292 A1 | 6/2017 | Kimura et al. |
| 2018/0375395 A1 | 12/2018 | Yamagishi |
| 2019/0238017 A1 | 8/2019 | Ohira |

* cited by examiner

PRELOADING MAGNETS IN A ROTOR CORE

INTRODUCTION

The present disclosure relates to a permanent magnet rotor core for an automotive electric machine. More specifically, the present disclosure relates to preloading the magnets within a rotor core to secure such magnets in position.

High power density, lightweight electric machines such as starters and generators have been used for many years in automobiles. A requirement for lightweight units has resulted in the design of higher speed motors and generators to maximize the power to weight ratios of the units. Recent advances in permanent magnet materials, such as the development of ferrite and rare earth compounds, have allowed designers to further increase the power density of rotating electric machines.

The use of permanent magnet materials in high speed rotating electrical equipment poses a number of problems with respect to material support and the definition of magnetic flux paths which have hindered the application of these materials to very high speed electric machines. In known rotors for electric machines, a plurality of permanent magnets are embedded in magnet slots formed within laminations sheets of a rotor core. The shape and position of magnet slots within the lamination sheets define a plurality of magnetic pole pieces to forma series of magnetic poles. These magnetic poles force flux through several paths within the electric machine. The path which links the stator windings and produces useful torque is known as the main flux path. Other paths which do not link the stator winding circuit produce no torque and are commonly called leakage flux paths.

A primary design consideration in permanent magnet electric machines which utilize permanent magnets is the minimization of leakage flux paths. Movement of the permanent magnets within the magnets slots causes varying flux paths resulting in flux leakage. The flux field follows flux paths which can be boosted or opposed. Boosting or intensifying the flux field will allow the motor to temporarily increase torque production. Opposing the flux field will negate the existing magnet field of the motor. A reduced magnet field will limit torque production.

Known permanent magnet rotor designs have been proposed which required the bonding of magnetic and nonmagnetic materials in a high speed rotor configuration. This type of bonding is difficult to implement in the rotor manufacturing process. Other designs utilize trapezoidal shaped magnets which are axially pressed against one another resulting is the permanent magnets wedging securely in place. Manufacture of permanent magnets having such complex shapes is expensive, and size tolerances of the permanent magnets can result in magnets that do not fit completely within the core stack, or alternatively, do not completely fill the length of the core stack.

Another design limitation in current rotors is the maximum speed that the rotor can spin before the structure of lamination plates within the core stack deforms under centrifugal forces. New electric machine designs require high speed motors, wherein the rotor spins at very high speeds. The magnet slots formed within the lamination plates defines a web between adjacent magnet slots. At high rotational speeds, the mass of the magnets positioned within the magnet slots is biased outward by centrifugal forces generated by the spinning rotor. These centrifugal forces put stress on the web between the magnet slots, and eventually cause deformation of the lamination plates at the web.

Thus, while current permanent magnet electric machines achieve their intended purpose, there is a need for a new and improved rotor core for an electric machine that uses a wedge to provide lateral force against the magnets within magnets slots to preload the magnets and secure the magnets in position within the magnet slots, and also inducing a compressive stress on the web between the magnet slots, thus increasing the maximum speed at which the rotor can rotate before mechanical failure.

SUMMARY

According to several aspects of the present disclosure, a rotor core for an electric machine of an automobile includes a core stack including a plurality of lamination plates, each lamination plate including a plurality of apertures formed therein, the apertures of each of the lamination plates axially aligned to define a plurality of magnet slots extending axially through the core stack, a plurality of magnets stacked axially within each of the plurality of magnet slots along a length of the core stack, at least one of the plurality of magnet slots including a cavity extending axially along the length of the core stack, and a wedge inserted within the cavity adapted to apply a lateral force onto the plurality of magnets within the at least one magnet slot to secure the plurality of magnets within the at least one magnet slot.

According to another aspect, the cavity within the at least one magnet slot includes a nub defining a lateral support surface for the wedge, the wedge positioned between the nub and the plurality of magnets within the at least one magnet slot.

According to another aspect, the wedge is made from a non-magnetic material.

According to another aspect, the cavity includes a depression positioned opposite the nub, the depression extending toward a web of the rotor core.

According to another aspect, the wedge comprises a first angled block and a second angled block, the first and second angled blocks each including a sloped surface, the sloped surface of the first angled block in contact with the sloped surface of the second angled block, wherein when the first and second angled blocks are pushed axially toward one another, sliding movement of the first and second angled blocks relative to one another on the sloped surfaces forces the first and second angled blocks to expand laterally against the nub and the plurality of magnets.

According to another aspect, the wedge comprises a first stepped block and a second stepped block, the first and second stepped blocks each including a plurality of sloped surfaces, the sloped surfaces of the first stepped block in contact with corresponding sloped surfaces of the second stepped block, wherein when the first and second stepped blocks are pushed axially toward one another, sliding movement of the first and second stepped blocks relative to one another on the sloped surfaces forces the first and second stepped blocks to expand laterally against the nub and the plurality of magnets.

According to another aspect, the wedge includes a tube made from deformable material press fit within the cavity between the support surface of the nub and the plurality of magnets, the tube pushing laterally outward against the support surface of the nub and the plurality of magnets.

According to another aspect, the rotor core further includes a first support insert positioned within the cavity adjacent the nub and extending axially along the length of the core stack.

According to another aspect, the wedge includes a plurality of deformable pieces positioned within the cavity between the first support insert and the plurality of magnets, the plurality of deformable pieces being axially compressed within the cavity and pushing laterally outward against the first support insert and the plurality of magnets.

According to another aspect, the deformable inserts are one of cylindrical in shape and spherical in shape.

According to another aspect, the wedge includes a strip of corrugated material positioned within the cavity between the first support insert and the plurality of magnets, the strip of corrugated material being axially compressed within the cavity and pushing laterally outward against the first support insert and the plurality of magnets.

According to another aspect, the wedge includes a strip of corrugated material press fit within the cavity between the first support insert and the plurality of magnets, the strip of corrugated material pushing laterally outward against the first support insert and the plurality of magnets.

According to another aspect, the wedge includes a strip having deformable features formed therein, a thickness of the strip being greater than a distance between the first support insert and the plurality of magnets such that the strip pushes laterally outward against the first support insert and the plurality of magnets.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
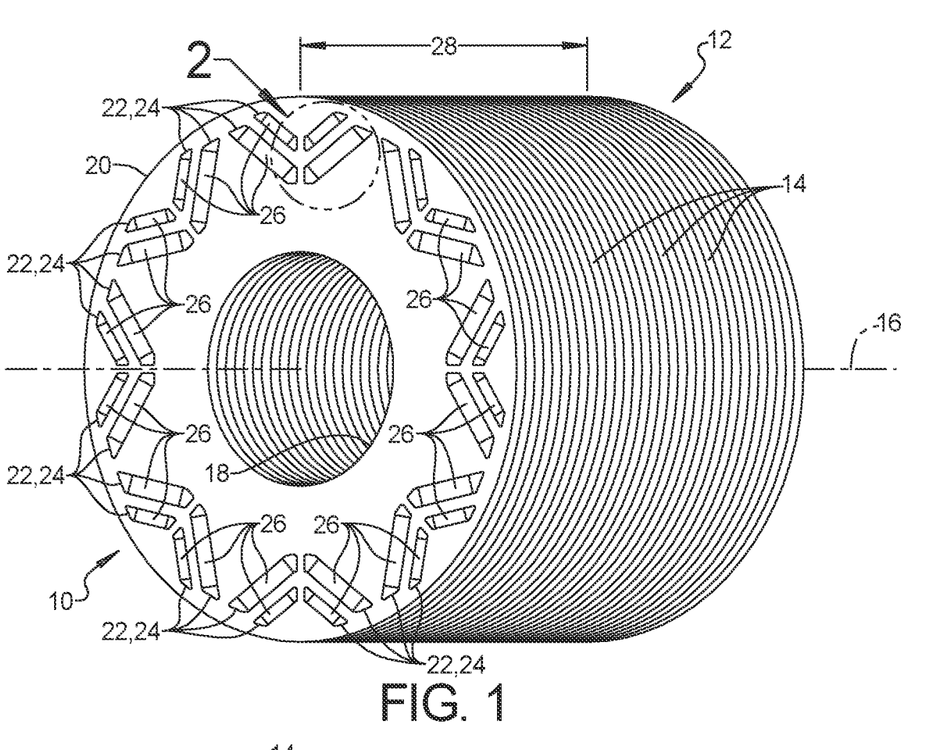
FIG. 1 is a perspective view of a rotor core according to an exemplary embodiment of the present disclosure.

Referring to FIG. 1, a rotor core 10 for an electric machine of an automobile includes a core stack 12 including a plurality of identical lamination plates 14. The rotor core 12 is from an electric machine within an automobile, such as, but not limited to, a starter, an alternator, a starter/generator, or other electric motor. Each of the lamination plates 14 is manufactured from a ferrous material, such as but not limited to steel or non-orientated electrical steel. The lamination plates 14 are disposed adjacent each other along a central axis 16 to define the core stack 12. The core stack has an inner diameter 18, and an outer diameter 20.

Each of the lamination plates 14 includes a plurality of apertures 22 formed therein. The lamination plates 14 are aligned along the central axis 16 relative to one another such that the apertures 22 of each of the lamination plates 14 are axially aligned with the corresponding apertures 22 in adjacent lamination plates 14 to define a plurality of magnet slots 24. The magnet slots 24 extend axially through the core stack 12 parallel to the central axis 16. The magnet slots 24 are adapted to support a plurality of permanent magnets 26 stacked axially within each of the plurality of magnet slots 24 along a length 28 of the core stack 12.

In the exemplary embodiment shown in FIG. 1, the core stack 12 includes eight symmetrical groups of magnet slots 24 evenly spaced circumferentially around the core stack 12. Each group of magnet slots 24 includes four magnet slots 24 which are oriented in a V-shape. The magnet slots 24 of each group further define outer flux guides 30, middle flux guides 32 and inner flux guides 34. The outer, middle and inner flux guides 30, 32, 34 provide a flux path for electrical flux currents during operation of the rotor core 10.

Figure 2:
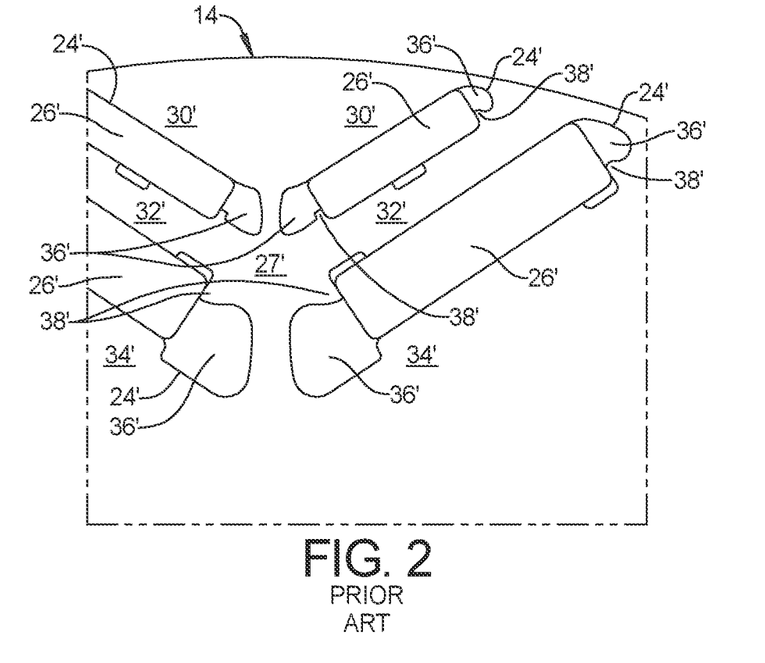
FIG. 2 is a top view of magnet slots within a lamination plate of a prior art rotor core.

Referring to FIG. 2, in prior art designs, a magnet slot 24' includes openings 36' to increase reluctance paths and encourage electric flux through the outer, middle and inner flux guides 30', 32', 34'. In such prior art designs, the magnet slots 24' include features 38' adapted to support permanent magnets 26' within the magnets slots 24'. These features 38' are adapted to, as much as possible, prevent movement and mis-alignment of the permanent magnets 26' within the magnet slots 24'. However, there must be sufficient clearance between the features 38' and the permanent magnets 26' to allow insertion of the permanent magnets 26' within the magnet slots 24', resulting in some amount of potential movement of the permanent magnets 26'.

Referring again to FIG. 2, the position and shape of the magnet slots 24' define a web 27'. The web 27' is positioned within the V-shape of each group of magnets slots 24', and interconnects adjacent outer flux guides 30', middle flux guides 32' and inner flux guides 34'. These webs are the structurally weakest portion of the core stack 12. When the rotor core 10 spins at high speeds, centrifugal forces act on the permanent magnets 26', pushing the permanent magnets 26', radially outward, and putting stress on the web 27'. At sufficiently high rotational speeds, the centrifugal forces may become high enough to cause deformation and mechanical failure within the core stack 12.

Figure 3A:
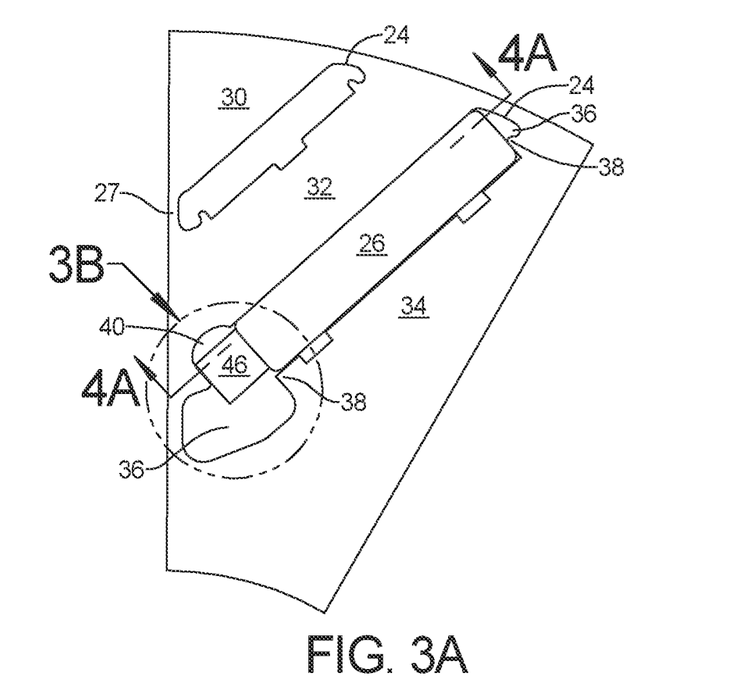
FIG. 3A is an enlarged view of the rotor core shown in FIG. 1, as indicated by the area encircled and labelled "FIG. 3A" in FIG. 1.
Figure 3B:
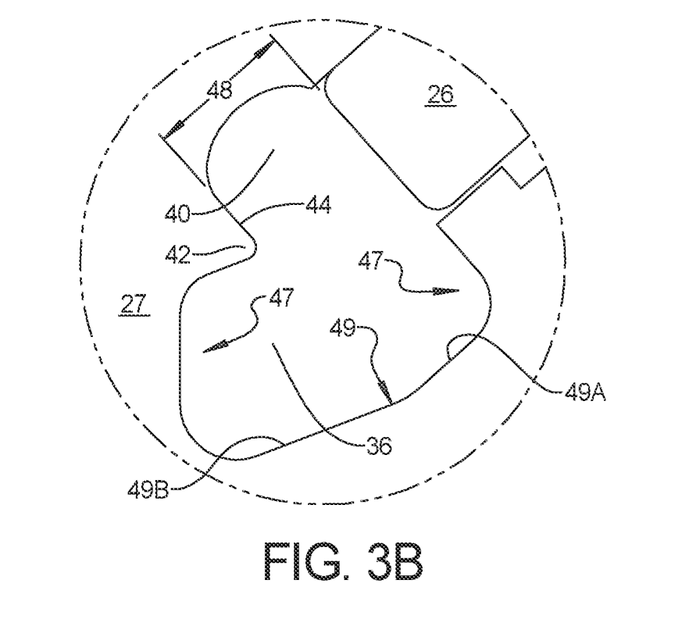
FIG. 3B is an enlarged view of FIG. 3A, as indicated by the area encircled and labelled "FIG. 3B" in FIG. 3A.

Referring to FIG. 3A, and FIG. 3B, in the rotor core 10 of the present disclosure, each of the magnet slots 24 includes openings 36 to increase reluctance paths and encourage electric flux through the outer, middle and inner flux guides 30, 32, 34, and the magnet slots 24 include features 38 adapted to support permanent magnets 26 within the magnets slots 24. In addition, at least one of the plurality of magnet slots 24 includes a cavity 40 extending axially along the length 28 of the core stack 12. The cavity 40 within the at least one magnet slot 24 includes a nub 42 defining a lateral support surface 44.

As shown in FIG. 3A, a wedge 46 is inserted within the cavity 40. The wedge 46 is adapted to apply a lateral force onto the plurality of magnets 26 within the at least one magnet slot 24 to preload and secure the plurality of magnets 26 within the at least one magnet slot 24, and to induce a compressive force into the web 27 between adjacent magnet slots 24. The wedge 40 is positioned between the nub 42 and the plurality of magnets 26 within the at least one magnet slot 24. The nub 42 is positioned adjacent a "top" of the magnet slot 24, wherein, the wedge, will act on an end of the permanent magnet 26 and adjacent a corner of the permanent magnet 26 that is nearest the web 27. This provides the shortest path to more efficiently transfer compressive stress into the web 27. It should be understood, that any number or all of the magnet slots 24 may include a cavity 40 and a wedge 46 adapted to secure the magnets 26 therein.

In an exemplary embodiment, the wedge 46 is formed from a non-magnetic material. The wedge 46 will not provide an easy flux leakage path, and thus does not interfere with the flux paths through the outer, middle and inner flux guides 30, 32, 34.

Referring to FIG. 3B, wherein the cavity 40 is shown without the wedge 46 positioned therein, in an exemplary embodiment, a distance 48 between the support surface 44 of the nub 42 and the plurality of magnets 26 is specifically designed to correspond to a lateral thickness of the wedge 46 to ensure that the wedge 46 functions properly within the cavity 40 and exerts lateral forces onto the plurality of magnets 26 to secure the magnets 26 within the magnet slot 24.

The cavity includes a depression 47 positioned opposite the nub 42. The depression 47 provides a gap between the nub 42 and a cavity wall 49 opposite the nub 42, to reduce flux leakage between the nub 42 and the cavity wall 49 opposite the nub 42. The depression 47 extends toward the web 27 of the rotor core 12, wherein the web 27 of a rotor core 12 of the present disclosure is substantially similar to a web 27' of prior art rotor cores. As shown in FIG. 3A and FIG. 3B, the cavity wall 49 opposite the nub 42 includes a first section 49A that is substantially parallel to the wedge 46 and perpendicular to an end of the permanent magnet 26. The cavity wall 49 opposite the nub 42 further includes a second section 49B that angles upward to direct the shape of the depression 47 toward the web 27.

Figure 4A:
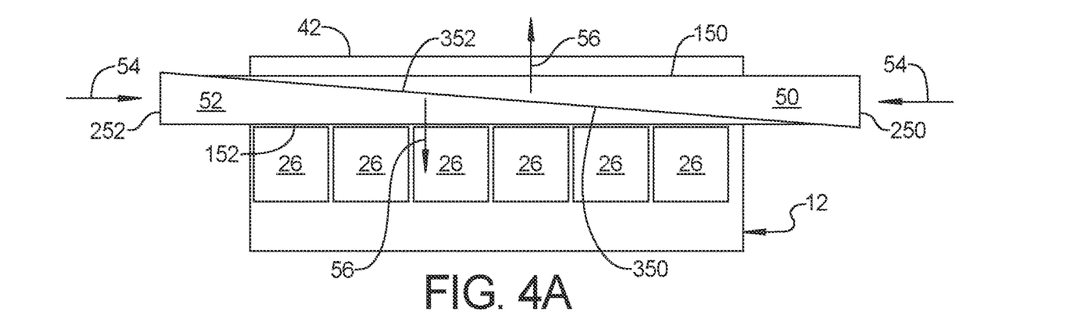
FIG. 4A is a sectional view taken along line 4A-4A of FIG. 3B, illustrating an exemplary embodiment of the present disclosure, wherein a wedge includes first and second angled blocks.

Referring to FIG. 4A, a cross section of the rotor core 12 taken along line 4A-4A in FIG. 3A is shown schematically. As shown in FIG. 4A, in an exemplary embodiment, the wedge 46 comprises a first angled block 50 and a second angled block 52. As shown, the first angled block 50 has a right-triangle shape including an outer side 150 adjacent to and in contact with the support surface 44 of the nub 42 and parallel to the central axis 16 of the core stack 12, an end 250 that is perpendicular to the central axis 16 of the core stack 12, and a sloped surface 350 facing laterally inward toward the plurality of magnets 26. The second angled block 52 has a right-triangle shape including an outer side 152 adjacent to and in contact with the plurality of magnets 26 and parallel to the central axis 16 of the core stack 12, an end 252 that is perpendicular to the central axis 16 of the core stack 12, and a sloped surface 352 facing laterally inward toward the nub 42.

The sloped surface 350 of the first angled block 50 is in contact with the sloped surface 352 of the second angled block 52. When the first and second angled blocks 50, 52 are pushed axially toward one another, as indicated by arrows 54, sliding movement of the first and second angled blocks 50, 52 relative to one another on the sloped surfaces 350, 352 forces the first and second angled blocks 50, 52 to expand laterally outward, as indicated by arrows 56. As the first and second angled blocks 50, 52 move laterally outward, the outer side 150 of the first angled block 50 pushes laterally against the support surface 44 of the nub 42, and the outer side 152 of the second angled block 52 pushes laterally against the plurality of magnets 26. The forces of the first and second angled blocks 50, 52 pushing outward against the nub 42 and the magnets 26 exerts a preload onto the plurality of magnets 26 to secure the plurality of magnets 26 within the magnet slot 24 and preventing any movement of the plurality of magnets 26 during operation of the rotor 10.

Figure 4B:
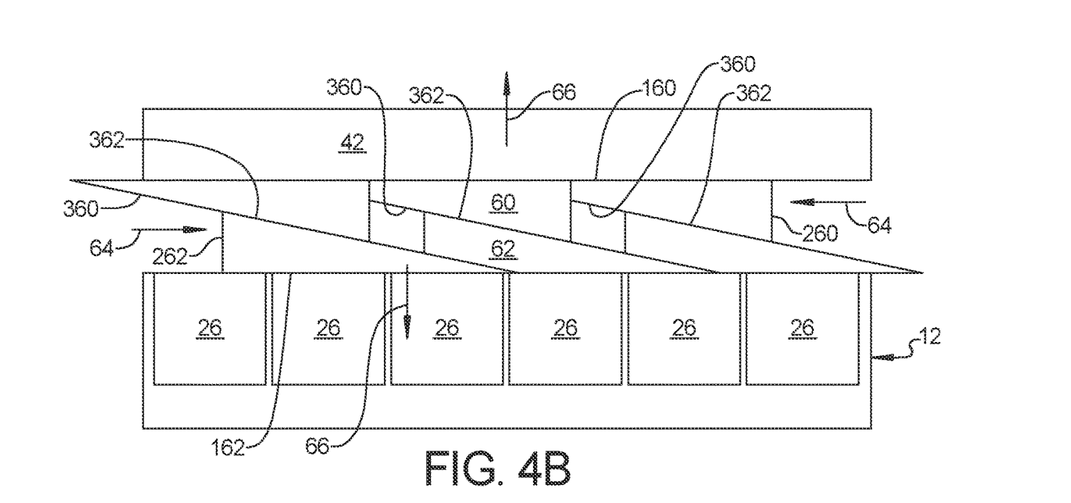
FIG. 4B is a sectional view, illustrating another exemplary embodiment of the present disclosure, wherein the wedge includes first and second stepped blocks.

Referring to FIG. 4B, a schematic view of another exemplary embodiment of the wedge 46 is shown, wherein the wedge 46 comprises a first stepped block 60 and a second stepped block 62. Each of the first and second stepped blocks 60, 62 includes a plurality of sloped surfaces 360, 362. As shown, the first stepped block 60 has an outer side 160 adjacent to and in contact with the support surface 44 of the nub 42 and parallel to the central axis 16 of the core stack 12, an end 260 that is perpendicular to the central axis 16 of the core stack 12, and three sloped surfaces 360 facing laterally inward toward the plurality of magnets 26. The second stepped block 62 has an outer side 162 adjacent to and in contact with the plurality of magnets 26 and parallel to the central axis 16 of the core stack 12, an end 262 that is perpendicular to the central axis 16 of the core stack 12, and three sloped surfaces 362 facing laterally inward toward the nub 42.

Each of the sloped surfaces 360 of the first stepped block 60 are in contact with one of the sloped surfaces 362 of the second stepped block 62. It should be understood, that there may be any suitable number of sloped surfaces 360, 362 on the first and second stepped blocks 60, 62, so long as the first and second stepped blocks 60, 62 each have the same number of sloped surfaces 360, 362. When the first and second stepped blocks 60, 62 are pushed axially toward one another, as indicated by arrows 64, sliding movement of the first and second stepped blocks 60, 62 relative to one another on the sloped surfaces 360, 362 forces the first and second stepped blocks 60, 62 to expand laterally outward, as indicated by arrows 66.

As the first and second stepped blocks 60, 62 move laterally outward, the outer side 160 of the first stepped block 60 pushes laterally against the support surface 44 of the nub 42, and the outer side 162 of the second stepped block 62 pushes laterally against the plurality of magnets 26.

The forces of the first and second stepped blocks 60, 62 pushing outward against the nub 42 and the magnets 26 exerts a preload onto the plurality of magnets 26 to secure the plurality of magnets 26 within the magnet slot 24 and preventing any movement of the plurality of magnets 26 during operation of the rotor 10.

Figure 5:
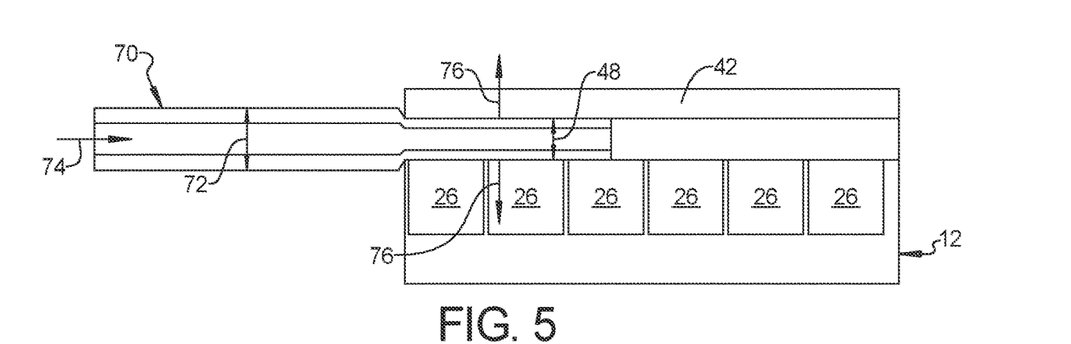
FIG. 5 is a sectional view, illustrating another exemplary embodiment of the present disclosure, wherein the wedge includes a tube of flexible material.

Referring to FIG. 5, in another exemplary embodiment, the wedge 46 includes a tube 70 made from deformable material. For ease of description, the tube 70 is shown partially inserted within the cavity 40 of the magnet slot 24. The tube 70 has a generally hollow cylindrical shape, and an outer diameter 72, prior to insertion, that is larger than the distance 48 between the nub 42 and the plurality of magnets 26 within the cavity 40. The tube 70 is press fit within the cavity 40 between the support surface 44 of the nub 42 and the plurality of magnets 26. As the tube 70 is pressed into place, shown by arrow 74, the tube 70 collapses slightly due to an interference fit. The tube 70 is made from a flexible material, thus when inserted, the tube 70 does not catastrophically fail, but rather compresses. Once the tube 70 is pressed within the cavity 40, elasticity of the tube 70 causes the tube 70 to push laterally outward against the support surface 44 of the nub 42 and the plurality of magnets 26, as indicated by arrows 76.

Figure 6A:
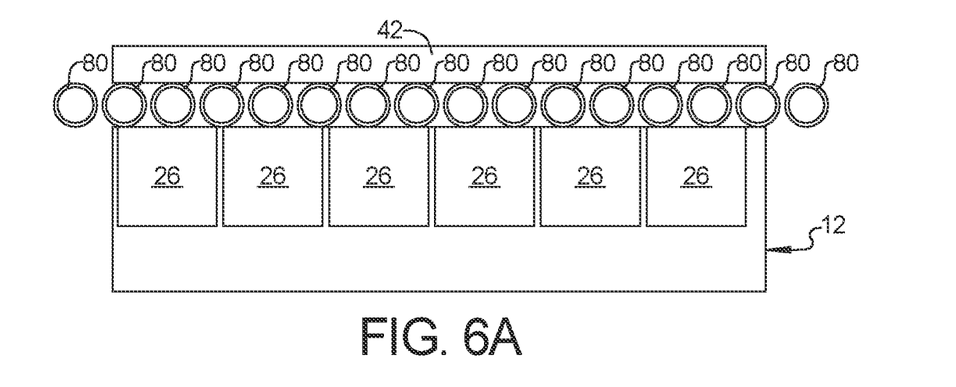
FIG. 6A is a sectional view, illustrating another exemplary embodiment of the present disclosure, wherein the wedge includes a plurality of deformable cylindrical pieces.
Figure 6B:
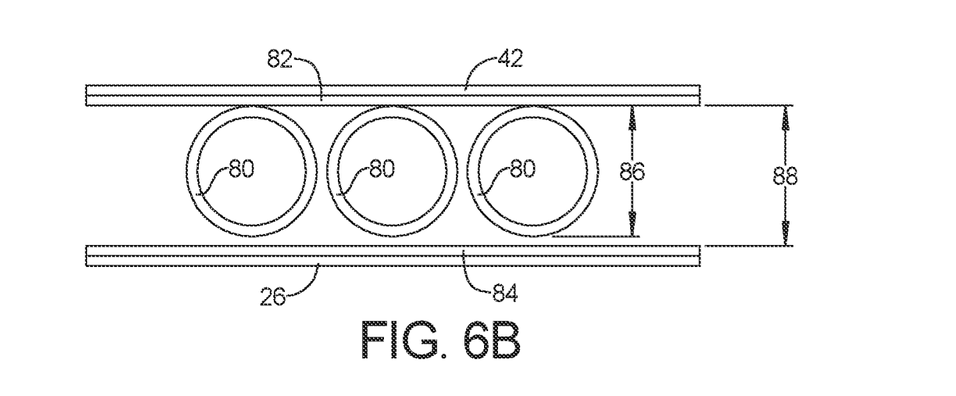
FIG. 6B is schematic view of the deformable cylindrical pieces loosely placed within a cavity of a magnet slot.

Referring to FIG. 6A, in another exemplary embodiment, the wedge 46 includes a plurality of deformable pieces 80 positioned within the cavity 40. Referring to FIG. 6B, the rotor core 12 includes a first support insert 82 positioned within the cavity 40 adjacent the nub 42 and extending axially along the length 28 of the core stack 12. The first support insert 82 is a strip of material that spans all of the lamination plates 14 to provide a solid support. The plurality of deformable pieces 80 are positioned within the cavity 40 between the first support insert 82 and the plurality of magnets 26. As shown, the rotor core 12 further includes a second support insert 84 positioned within the cavity 40 adjacent the plurality of magnets 26 and extending axially along the length 28 of the core stack 12.

When the plurality of deformable pieces 80 are compressed axially, the deformable pieces 80 compress in the axial direction and squeeze laterally outward, pushing laterally against the first and second support inserts 82, 84 and, through the first and second support inserts 82, 84, the support surface 44 of the nub 42 and the plurality of magnets 26. The first and second support inserts 82, 84 ensure that none of the plurality of deformable pieces 80 that make up the wedge 46 squeeze between the lamination plates 14 or between adjacent pairs of the plurality of magnets 26, so all of the force from lateral expansion of the deformable pieces 80 is transferred to the nub 42 and to the plurality of magnets 26 along the length 28 of the core stack 12.

Referring again to FIGS. 6A and 6B, in an exemplary embodiment, the deformable pieces 80 are cylindrical and hollow. The deformable pieces 80 have a resting diameter 86 that is less than the distance 88 between the first and second support inserts 82, 84. The deformable pieces 80 are stacked between the first and second support inserts 82, 84 with radial outer walls 88 of the deformable pieces 80 facing the first and second support inserts 82, 84 and the radial outer walls 88 of the deformable pieces 80 facing adjacent deformable pieces 80.

Figure 6C:
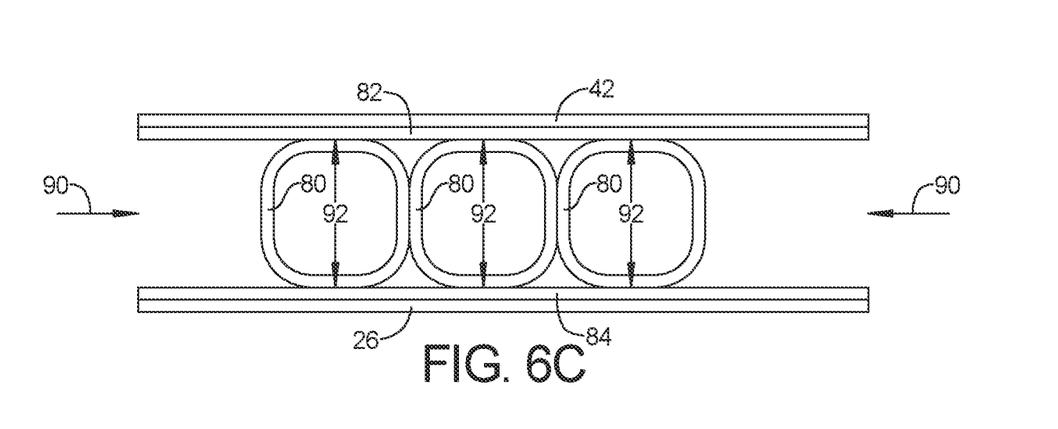
FIG. 6C is a schematic view of the deformable cylindrical pieces axially compressed within the cavity of a magnet slot.

Referring to FIG. 6C, when axial force is applied to the stack of deformable pieces 80, as indicated by arrows 90, the cylindrical deformable pieces 80 compress and squeeze laterally outward, as indicated by arrows 92, to push against the first and second support inserts 82, 84, and thus against the support surface 44 of the nub 42 and the plurality of magnets 26. The deformable pieces 80 may be made from any suitable compressible material, such as for example, rubber. The deformable pieces 80 may be placed individually between the first and second support inserts 82, 84, or bonded together in a stack and inserted as a single piece.

Figure 7A:
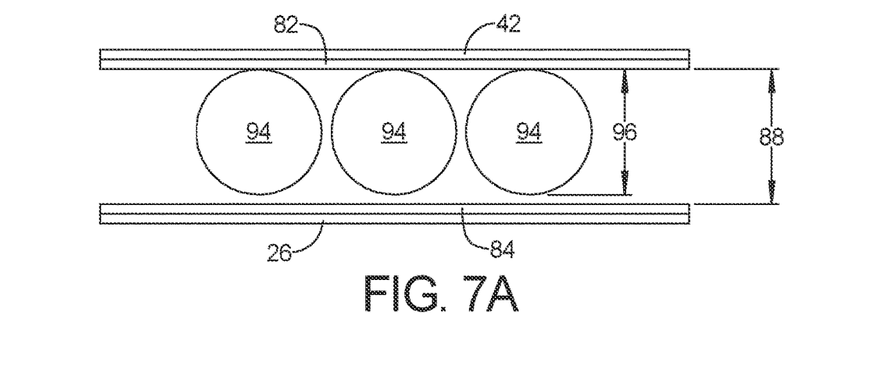
FIG. 7A is schematic view of deformable spherical pieces loosely placed within the cavity of a magnet slot.
Figure 7B:
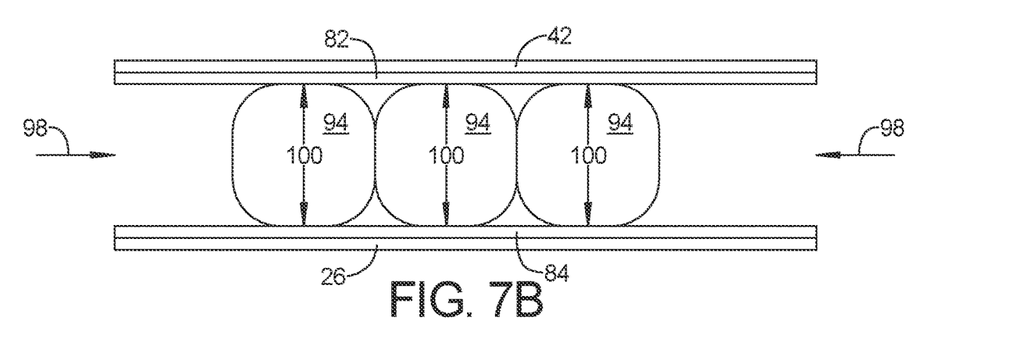
FIG. 7B is a schematic view of the deformable spherical pieces axially compressed within the cavity of a magnet slot.

Referring FIG. 7A, in an exemplary embodiment, the rotor 10 includes deformable pieces 94 that are spherical. The spherical deformable pieces 94 may be hollow or solid. The spherical deformable pieces 94 have a resting diameter 96 that is less than the distance 88 between the first and second support inserts 82, 84. The spherical deformable pieces 94 are stacked between the first and second inserts 82, 84. Referring to FIG. 7B, when axial force is applied to the stack of spherical deformable pieces 94, as indicated by arrows 98, the spherical deformable pieces 94 compress and squeeze laterally outward, as indicated by arrows 100, to push on the first and second support inserts 82, 84, and thus against the support surface 44 of the nub 42 and the plurality of magnets 26.

Figure 8A:
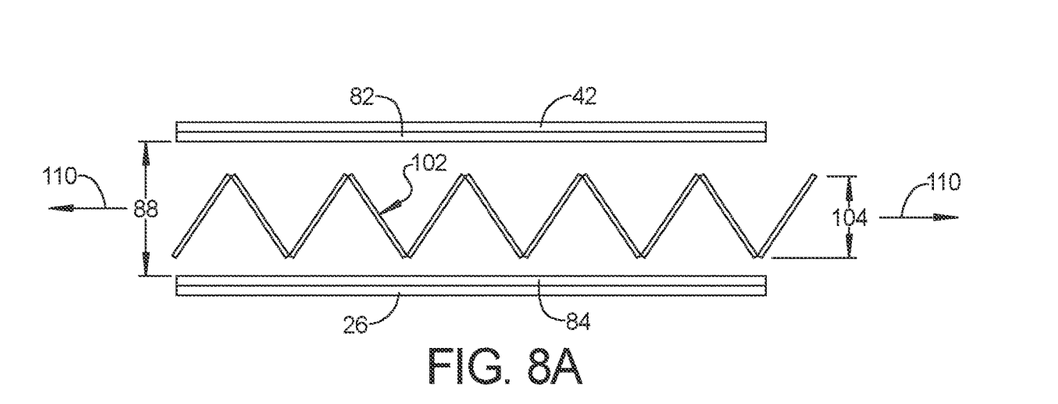
FIG. 8A is a schematic view of a wedge comprising a corrugated strip loosely placed within the cavity of a magnet slot.

In another exemplary embodiment, the wedge 46 includes a strip of corrugated material 102 positioned within the cavity 40 between the first and second support inserts 82, 84. Referring to FIG. 8A, the strip of corrugated material 102 has a resting thickness 104 that is less than the distance 88 between the first and second support inserts 82, 84. The strip of corrugated material 102 is placed within the cavity 40, between the first and second support inserts 82, 84, and referring to FIG. 8B, when axial forces are applied to the strip of corrugated material 102, as indicated by arrows 106, the strip of corrugated material 102 elastically and plastically deforms to compress axially and expand laterally to push against the first and second support inserts 82, 84, as indicated by arrows 108.

Alternatively, referring again to FIG. 8A, the strip of corrugated material 102 has a resting thickness that is greater than the distance 88 between the first and second support inserts 82, 84. The strip of corrugated material 102 is axially stretched, as indicated by arrows 110, causing the strip of corrugated material 102 to elastically and plastically deform and axially lengthen, and laterally compress to a thickness that is less than the distance 88 between the first and second support inserts 82, 84. The strip of corrugated material 102 is placed within the cavity 40 between first and second support inserts 82, 84 while stretched in this manner. Referring again to FIG. 8B, when the axial forces that stretch the strip of corrugated material 102 are removed, the strip of corrugated material 102, due to elasticity, snaps back toward its resting shape, wherein the strip of corrugated material 102 compresses axially and expands laterally outward to contact the first and second support inserts 82, 84. The elasticity of the strip of corrugated material 102 exerts force against the first and second support inserts 82, 84 as indicated by arrows 108.

In still another variation having a wedge 46 comprising a strip of corrugated material 102, the strip of corrugated material 102 has a resting thickness that is greater than the distance 88 between the first and second support inserts 82, 84. The strip of corrugated material 102 is axially press fit between the first and second support inserts 82, 84. As the strip of corrugated material 102 is pressed between the first and second support inserts 82, 84, the strip of corrugated material 102 is elastically and plastically deformed to laterally compress the strip of corrugated material 102 between the first and second support inserts 82, 84. Once press fit between the first and second support inserts 82, 84, the elasticity of the strip of corrugated material 102 exerts force against the first and second support inserts 82, 84 as indicated by arrows 108, in FIG. 8B.

Figure 8B:
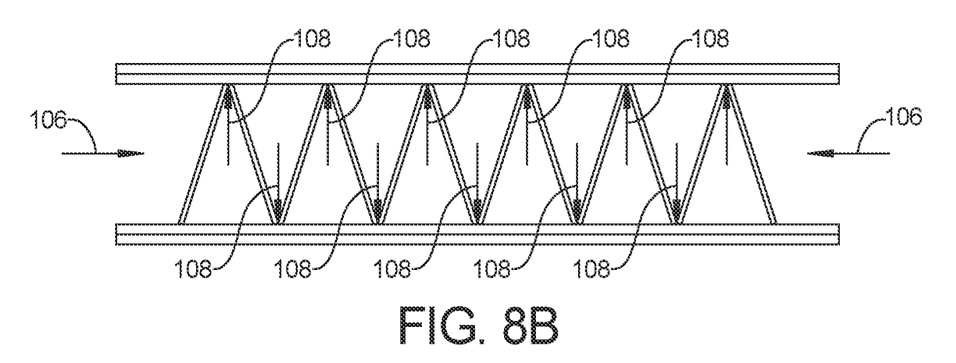
FIG. 8B is a schematic view of the corrugated strip axially compressed within the cavity of the magnet slot.

The strip of corrugated material 102 exerts forces through point contact of alternating peaks and valleys. The first and second support inserts 82, 84 act to evenly spread lateral outward forces to the nub 42 and the plurality of magnets 26 along the length 28 of the core stack 12.

Figure 9A:
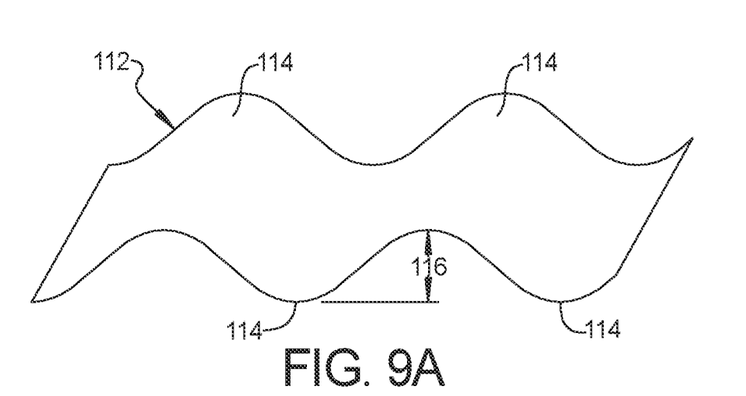
FIG. 9A is a perspective view of a wedge comprising a strip having deformable features.
Figure 9B:
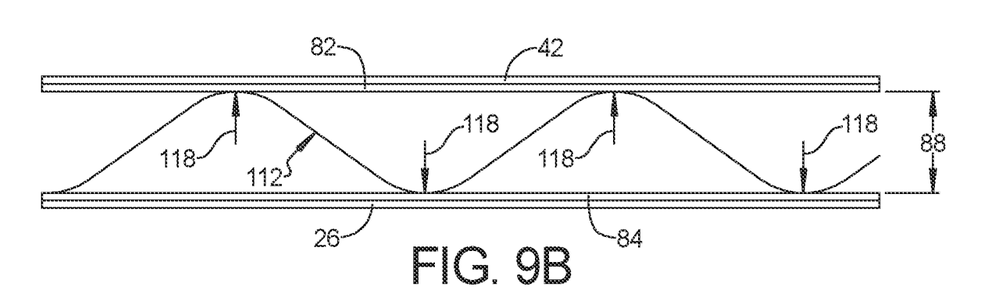
FIG. 9B is a schematic view of the wedge shown in FIG. 9A, wherein the strip is press fit within the cavity of a magnet slot.

In another exemplary embodiment, the wedge 46 comprising a strip 112 having deformable features 114 formed therein. Referring to FIGS. 9A and 9B, an example of such a strip 112 includes a sinusoidal shape defining deformable features 114 in the form of a plurality of alternating curved peaks and valleys. The a strip 112 having deformable features 114 has a resting thickness 116 that is greater than the distance 88 between the first and second support inserts 82, 84. The strip 112 having deformable features 114 is axially press fit between the nub 42 and the plurality of magnets 26. Alternatively, the strip 112 having deformable features 114 may be axially press fit between first and second support inserts 82, 84, as shown in FIG. 9B.

As the strip 112 having deformable features 114 is pressed between the first and second support inserts 82, 84, the strip 112 having deformable features 114 is elastically and plastically deformed to laterally compress the strip 112 having deformable features 114 between the first and second support inserts 82, 84. Once press fit between the first and second support inserts 82, 84, the elasticity of the deformable features 114 exerts force against the first and second support inserts 82, 84 as indicated by arrows 118, in FIG. 9B. It should be understood that the deformable features 114 could comprise features embossed into the strip 112, such as dimples extending from one or both sides of the strip 112, wherein, when press fit between the first and second support inserts 82, 84, the dimples elastically and plastically deform to compress laterally between the first and second support inserts 82, 84.

A rotor core 10 of the present disclosure offers several advantages. These include the ability to secure magnets 26 within the magnet slots 24 to preload the magnets 26 and prevent movement of the magnets 26 within the magnet slots 24 without designing magnets 26 having complex trapezoidal shapes. Another advantage of the rotor core of the present disclosure is that the wedge 46 induces a compression into the web 27 of the rotor core 12, to prevent deformation and failure of the web 27 of the rotor core 12 under centrifugal forces experienced by the rotor core 12 when rotating at high speeds.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor core for an electric machine of an automobile, comprising:
   a core stack including a plurality of lamination plates;
   each lamination plate including a plurality of apertures formed therein, the apertures of each of the lamination plates axially aligned to define a plurality of magnet slots extending axially through the core stack;
   a plurality of magnets stacked axially within each of the plurality of magnet slots along a length of the core stack;
   at least one of the plurality of magnet slots including a cavity extending axially along the length of the core stack; and
   a wedge inserted within the cavity adapted to apply a lateral force onto the plurality of magnets within the at least one magnet slot to secure the plurality of magnets within the at least one magnet slot, and to provide a pre-load within the lamination plate to increase resilience of the rotor core against centrifugal stresses;
   wherein the wedge comprises a first angled block and a second angled block, the first and second angled blocks each including a sloped surface, the sloped surface of the first angled block in contact with the sloped surface of the second angled block, wherein when the first and second angled blocks are pushed axially toward one another, sliding movement of the first and second angled blocks relative to one another on the sloped surfaces forces the first and second angled blocks to expand laterally.

2. The rotor core of claim 1, wherein the cavity within the at least one magnet slot includes a nub defining a lateral support surface for the wedge, the wedge positioned between the nub and the plurality of magnets within the at least one magnet slot.

3. The rotor core of claim 1, wherein the wedge is made from a non-magnetic material.

4. The rotor core of claim 3, wherein the cavity includes a depression positioned opposite the nub, the depression extending toward a web of the rotor core.

5. The rotor core of claim 4, wherein sliding movement of the first and second angled blocks relative to one another on the sloped surfaces forces the first and second angled blocks to expand laterally against the nub and the plurality of magnets.

6. The rotor core of claim 5, wherein the first stepped block and the second stepped block each include a plurality of sloped surfaces, the sloped surfaces of the first stepped block in contact with corresponding sloped surfaces of the second stepped block, wherein when the first and second stepped blocks are pushed axially toward one another, sliding movement of the first and second stepped blocks relative to one another on the sloped surfaces forces the first and second stepped blocks to expand laterally against the nub and the plurality of magnets.

7. A rotor core for an electric machine of an automobile, comprising:
   a core stack including a plurality of lamination plates;
   each lamination plate including a plurality of apertures formed therein, the apertures of each of the lamination plates axially aligned to define a plurality of magnet slots extending axially through the core stack;
   a plurality of magnets stacked axially within each of the plurality of magnet slots along a length of the core stack;
   at least one of the plurality of magnet slots including a cavity extending axially along the length of the core stack; and
   a wedge inserted within the cavity adapted to apply a lateral force onto the plurality of magnets within the at least one magnet slot to secure the plurality of magnets within the at least one magnet slot, and to provide a pre-load within the lamination plate to increase resilience of the rotor core against centrifugal stresses;
   wherein the wedge includes a tube made from deformable material press fit within the cavity between the support surface of the nub and the plurality of magnets, the tube pushing laterally outward against the plurality of magnets.

8. The rotor core of claim 7, wherein the cavity within the at least one magnet slot includes a nub defining a lateral support surface for the wedge, the wedge positioned between the nub and the plurality of magnets within the at least one magnet slot.

9. The rotor core of claim 7, wherein the wedge is made from a non-magnetic material.

10. The rotor core of claim 9, wherein the cavity includes a depression positioned opposite the nub, the depression extending toward a web of the rotor core.

11. The rotor core of claim 10, wherein the tube pushes laterally outward against the support surface of the nub and the plurality of magnets.

12. A rotor core for an electric machine of an automobile, comprising:
- a core stack including a plurality of lamination plates;
- each lamination plate including a plurality of apertures formed therein, the apertures of each of the lamination plates axially aligned to define a plurality of magnet slots extending axially through the core stack;
- a plurality of magnets stacked axially within each of the plurality of magnet slots along a length of the core stack;
- at least one of the plurality of magnet slots including a cavity extending axially along the length of the core stack;
- a wedge inserted within the cavity adapted to apply a lateral force onto the plurality of magnets within the at least one magnet slot to secure the plurality of magnets within the at least one magnet slot, and to provide a pre-load within the lamination plate to increase resilience of the rotor core against centrifugal stresses; and
- a first support insert positioned within the cavity.

13. The rotor core of claim 12, wherein the cavity within the at least one magnet slot includes a nub defining a lateral support surface for the wedge, the wedge positioned between the nub and the plurality of magnets within the at least one magnet slot.

14. The rotor core of claim 12, wherein the wedge is made from a non-magnetic material.

15. The rotor core of claim 14, wherein the cavity includes a depression positioned opposite the nub, the depression extending toward a web of the rotor core.

16. The rotor core of claim 15, wherein the first support insert is positioned within the cavity adjacent the nub and extending axially along the length of the core stack.

17. The rotor core stack of claim 16, wherein the wedge includes a plurality of deformable pieces positioned within the cavity between the first support insert and the plurality of magnets, the plurality of deformable pieces being axially compressed within the cavity and pushing laterally outward against the first support insert and the plurality of magnets.

18. The rotor core stack of claim 17, wherein the deformable inserts are one of cylindrical in shape and spherical in shape.

19. The rotor core stack of claim 16, wherein the wedge includes a strip of corrugated material positioned within the cavity between the first support insert and the plurality of magnets, the strip of corrugated material being axially compressed within the cavity and pushing laterally outward against the first support insert and the plurality of magnets.

20. The rotor core stack of claim 16, wherein the wedge includes a strip of corrugated material press fit within the cavity between the first support insert and the plurality of magnets, the strip of corrugated material pushing laterally outward against the first support insert and the plurality of magnets.

* * * * *